US012663746B2

(12) United States Patent
Sugiyama

(10) Patent No.: US 12,663,746 B2
(45) Date of Patent: Jun. 23, 2026

(54) IMAGE FORMING APPARATUS

(71) Applicant: CANON KABUSHIKI KAISHA, Tokyo (JP)

(72) Inventor: Yuki Sugiyama, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/894,126

(22) Filed: Sep. 24, 2024

(65) Prior Publication Data

US 2025/0110439 A1 Apr. 3, 2025

(30) Foreign Application Priority Data

Oct. 2, 2023 (JP) ................................ 2023-171146

(51) Int. Cl.
*G03G 15/23* (2006.01)
*G03G 15/00* (2006.01)

(52) U.S. Cl.
CPC ....... *G03G 15/6564* (2013.01); *G03G 15/234* (2013.01); *G03G 15/5029* (2013.01); *G03G 2215/00721* (2013.01); *G03G 2215/00734* (2013.01)

(58) Field of Classification Search
CPC ............. G03G 15/6564; G03G 15/234; G03G 15/5029
See application file for complete search history.

(56) References Cited

U.S. PATENT DOCUMENTS

2020/0073311 A1 * 3/2020 Saito ........................ B65H 7/06

FOREIGN PATENT DOCUMENTS

| | | | |
|---|---|---|---|
| JP | H06-271144 | A | 9/1994 |
| JP | 2014-125331 | A | 7/2014 |
| JP | 2018-205535 | A | 12/2018 |
| JP | 2021-020749 | A | 2/2021 |

* cited by examiner

*Primary Examiner* — Sevan A Aydin
(74) *Attorney, Agent, or Firm* — Venable LLP

(57) ABSTRACT

An image forming apparatus includes an image forming unit, a transfer unit and a control unit. The control unit switches between a first control in which the recording material is conveyed in the first direction and a second control in which the recording material is conveyed in a second direction. In performing a double-side printing in which an image is formed on first and second sides, the control unit performs a reciprocating control in which the first and second controls are alternately switched at least one time in a case in which it is predicted that the recording material reaches a transfer portion earlier than a toner image formed by the image forming unit to be transferred onto the second side when the recording material is being conveyed in a double-side conveyance path.

10 Claims, 10 Drawing Sheets

IMAGE FORMING APPARATUS

FIELD OF THE INVENTION AND RELATED ART

The present invention relates to an image forming apparatus. That is, the present invention relates to the image forming apparatus using an electrophotographic type or an electrostatic recording type and, for example, to the image forming apparatus provided with a switchback mechanism which reverses a conveyance direction of a sheet for double-side printing.

Conventionally, the image forming apparatus of the electrophotographic type which forms an image is known. In the image forming apparatus of the electrophotographic type, a toner image formed on an image bearing member and a transfer member is transferred to a recording medium such as a plain paper or a glossy paper (hereinafter referred to as a "sheet"), and then the sheet on which the toner image has been transferred is heated to fix the toner image on the sheet. In such image forming apparatus, in recent years, there has been a growing demand for faster sheet conveyance speed and a variety of sheet handling functions to improve productivity and user operability. As one of these, there is the image forming apparatus with a double-side printing function which automatically reverses and conveys the sheet to form the images on both sides of the sheet, without the user having to manually turn the sheet over and set it down upon printing on both sides of the sheet. In the double-side printing function, a reverse conveyance mechanism to reverse the sheet in a conveyance path is required. In the reverse conveyance mechanism, the sheet is conveyed to the conveyance path as a reverse conveyance portion (hereinafter referred to as a "double-side reverse conveyance path"), where the sheet is paused and then conveyed in an opposite direction. There is a type, at this time, in which the sheet is reversed and conveyed by switching to a double-side conveyance path in a direction different from that of a conveyance path through which it has been conveyed. For example, in Japanese Patent Application Laid-Open No. H06-271144, it is disclosed that the sheet in a double-side printing mode is paused at a pausing point for a predetermined time and then conveyance is resumed. By this, conveyance control to maintain an interval between the sheets constant after performing the pausing of the sheet due to a delay during image formation in the double-side printing is performed.

SUMMARY OF THE INVENTION

An object of the present invention is to provide an image forming apparatus comprising: an image forming unit configured to form a toner image; a transfer unit configured to transfer the toner image formed by the image forming unit in a transfer portion; a fixing unit configured to perform a fixing process to an unfixed toner image on a recording material; a first rotatable member configured to convey the recording material to the image forming unit in a conveyance direction as a first direction; a second rotatable member provided downstream of the fixing unit in the first direction; a driving source configured to drive the fixing unit and the second rotatable member; a detecting unit provided between the first rotatable member and the second rotatable member and configured to detect a leading end and a trailing end of the recording material; and a control unit configured to switch between a first control in which the second rotatable member is controlled so as to convey the recording material in the first direction and a second control in which the second rotatable member is controlled so as to convey the recording material in a second direction opposite to the first direction, wherein in performing a double-side printing in which an image is formed on a first side and a second side different from the first side of the recording material, the control unit is capable of conveying the recording material to the transfer portion again by switching the second rotatable member from the first control to the second control and conveying the recording material to a double-side conveyance path, and wherein the control unit performs a reciprocating control in which the first control and the second control are alternately switched at least one time in a case in which it is predicted that the recording material reaches the transfer portion earlier than the toner image formed by the image forming unit to be transferred onto the second side when the recording material is being conveyed in the double-side conveyance path.

Further features of the present invention will become apparent from the following description of exemplary embodiments with reference to the attached drawings.

DESCRIPTION OF THE EMBODIMENTS

Embodiment 1

Figure 1:
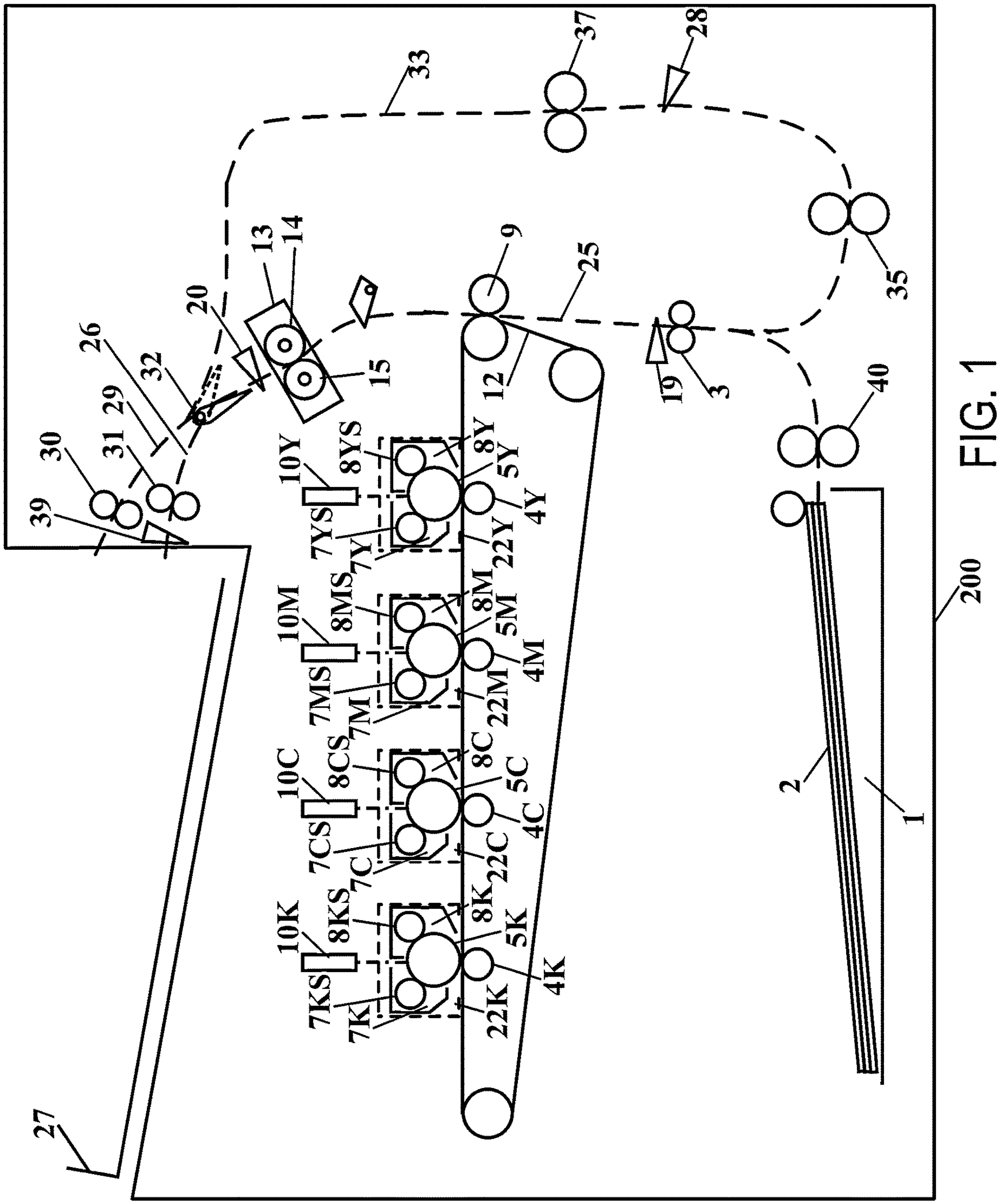
FIG. 1 is a schematic view of a laser printer engine in an Embodiment 1.

Hereinafter, an Embodiment 1 to which the present invention can be applied will be described. An outline of an overall configuration of a laser printer engine (hereinafter referred to as a "printer") as an image forming apparatus will be described using FIG. 1.

(Outline of the Image Forming Apparatus)

A printer 200 forms electrostatic latent images by image light which is formed based on image signal transmitted from a controller portion (not shown), develops the electrostatic latent images, and transfers and superimposes the visible images to form a color visible image. The printer 200 transfers the color visible images to a sheet 2 as a recording material and fixes the unfixed color visible images on the sheet 2 (on the recording material). An image forming portion is constituted by photosensitive drums 5Y, 5M, 5C and 5K, chargers 7Y, 7M, 7C and 7K, and developing units 8Y, 8M, 8C and 8K for each station disposed side-by-side correspondingly to developing colors and an intermediary transfer belt 12. The photosensitive drums 5Y, 5M, 5C and 5K, the chargers 7Y, 7M, 7C and 7K, and the developing units 8Y, 8M, 8C and 8K are mounted on process cartridges 22Y, 22M, 22C and 22K, which are mountable on and dismountable from a main assembly of the printer 200.

Each of the photosensitive drums 5Y, 5M, 5C and 5K is constituted by an organic photoconductive layer being applied to an outer periphery of an aluminum cylinder, and is rotated by driving force of a driving motor (not shown) being transmitted thereto. The driving motor rotates the photosensitive drums 5Y, 5M, 5C and 5K in a clockwise direction, for example, according to an image forming operation. It is configured that exposure lights to the photosensitive drums 5Y, 5M, 5C and 5K are emitted from scanner portions 10Y, 10M, 10C and 10K and selectively expose surfaces of the photosensitive drums 5Y, 5M, 5C and 5K so that the electrostatic latent images are formed, respectively.

Each station as an image forming unit is provided with the chargers 7Y, 7M, 7C and 7K as primary charging means to charge the photosensitive drums 5Y, 5M, 5C and 5K of the yellow (Y), magenta (M), cyan (C) and black (K), respectively. The chargers 7Y, 7M, 7C and 7K are provided with sleeves 7YS, 7MS, 7CS and 7KS, respectively.

To visualize the electrostatic latent image, each station is provided with the developing units 8Y, 8M, 8C and 8K as developing means, which perform developing of yellow (Y), magenta (M), cyan (C) and black (K), respectively. Each developing unit 8Y, 8M, 8C and 8K is provided with sleeves 8YS, 8MS, 8CS and 8KS, respectively. Each developing unit 8Y, 8M, 8C and 8K is mounted on the main assembly of the printer 200 mountably thereon and dismountably therefrom.

The intermediary transfer belt 12 as an intermediary transfer member is in contact with the photosensitive drums 5Y, 5M, 5C and 5K, and is rotated in a counterclockwise direction during the color image formation, for example, following the rotation of the photosensitive drums 5Y, 5M, 5C and 5K. Onto the intermediary transfer belt 12, the visible images are transferred by primary transfer voltage applied to primary transfer rollers 4Y, 4M, 4C and 4K. The intermediary transfer belt 12 transfers and superimposes the color visible images onto the sheet 2 by nipping and conveying the sheet 2 at a position of a secondary transfer roller 9 as a transfer unit (transfer portion).

A fixing device 13 as a fixing unit fixes the transferred color visible images while conveying the sheet 2. The fixing device 13 is provided with a fixing roller 14, which heats the sheet 2, and a pressing roller 15, which makes the sheet 2 be in pressure contact with the fixing roller 14. The fixing roller 14 and the pressing roller 15 are formed in hollow shapes, and a heater is built into an inside of the fixing roller 14. In other words, the sheet 2 having the color visible images is conveyed by the fixing roller 14 and pressing roller 15, and the toner is fixed to a surface thereof by heat and pressure being applied thereto. After the fixing of the visible images, the sheet 2 is conveyed to a discharging conveyance path 26 and discharged to a discharging portion by a discharging roller 31 to complete the image forming operation. A full load sensor 39 is a sensor which detects that a discharge tray 27 is fully loaded by a plurality of the sheets 2 stacked thereon. Incidentally, in a conveyance path of the sheet 2 shown in a broken line in FIG. 1, a registration sensor 19, a fixing and discharging sensor 20 and a double-side conveyance sensor 28, which are capable of detecting a leading end and a trailing end of the conveyed sheet 2, are disposed. Incidentally, a roller disposed before the registration sensor 19 in a conveyance direction is a registration roller 3 as a first rotatable member. In addition, the printer 200 is not limited to the configuration shown in FIG. 1, as long as it is capable of double-side printing.

(Double-Side Conveyance Control)

Next, double-side conveyance control upon performing printing on a front surface (first surface) and a back surface (second surface) of the sheet 2 will be described. The sheet 2, of which the front surface is printed and which passed through the fixing device 13, is conveyed to the double-side reversing path 29 by switching a rotational direction of a reversing roller 30 as a second rotatable member and a state of a double-side flapper 32 (solid line) by a reversing clutch 103 (see FIG. 2). When the trailing end of the sheet 2 reaches the double-side reversing path 29, the sheet 2 is conveyed to a double-side conveyance path 33 as a double-side conveyance path by switching the rotational direction of the reversing roller 30 and the state of the double-side flapper 32 (broken line) by the reversing clutch 103 again. The sheet 2, of which the conveyance direction is reversed, is conveyed through the double-side conveyance path 33 by a double-side conveyance roller 37 and a double-side sheet re-feeding roller 35.

Incidentally, a conveyance direction of the sheet 2 in which the sheet 2 is conveyed toward the discharging conveyance path 26 and the double-side reversing path 29 corresponds to a first direction, and a conveyance direction toward the double-side conveyance path 33 (opposite to the first direction) corresponds to a second direction. In addition, an engine control portion 301 (see FIG. 2), which will be described below, functions as a control unit which switches between a first control in which the reversing roller 30 is controlled so as to convey the sheet 2 in the first direction and a second control in which the reversing roller 30 is controlled so as to convey the sheet 2 in the second direction. Upon performing the double-side printing, in which the images are formed on the front surface and the back surface of the sheet 2, the sheet 2 is conveyed again to the secondary transfer roller 9 by the engine control portion 301 switching the reversing roller 30 from the first control to the second control and conveying the sheet 2 to the double-side conveyance path 33.

Incidentally, upon switching the conveyance direction of the sheet 2 in the double-side reversing path 29, a fixing motor 102 (see FIG. 2) as a driving source remains driven and drive to the reversing roller 30 cannot be cut off. Therefore, the conveyance of the sheet 2 by the reversing roller 30 does not stop, except for a small amount of time in which a driving gear train is changed over. In this manner, the sheet 2 enters a printing conveyance path 25 again in a state in which the front and back thereof is reversed, the toner image transfer and the fixing process to the back surface thereof are performed, and the sheet 2 is discharged to the discharging portion.

(Function Block Diagram)

Figure 2:
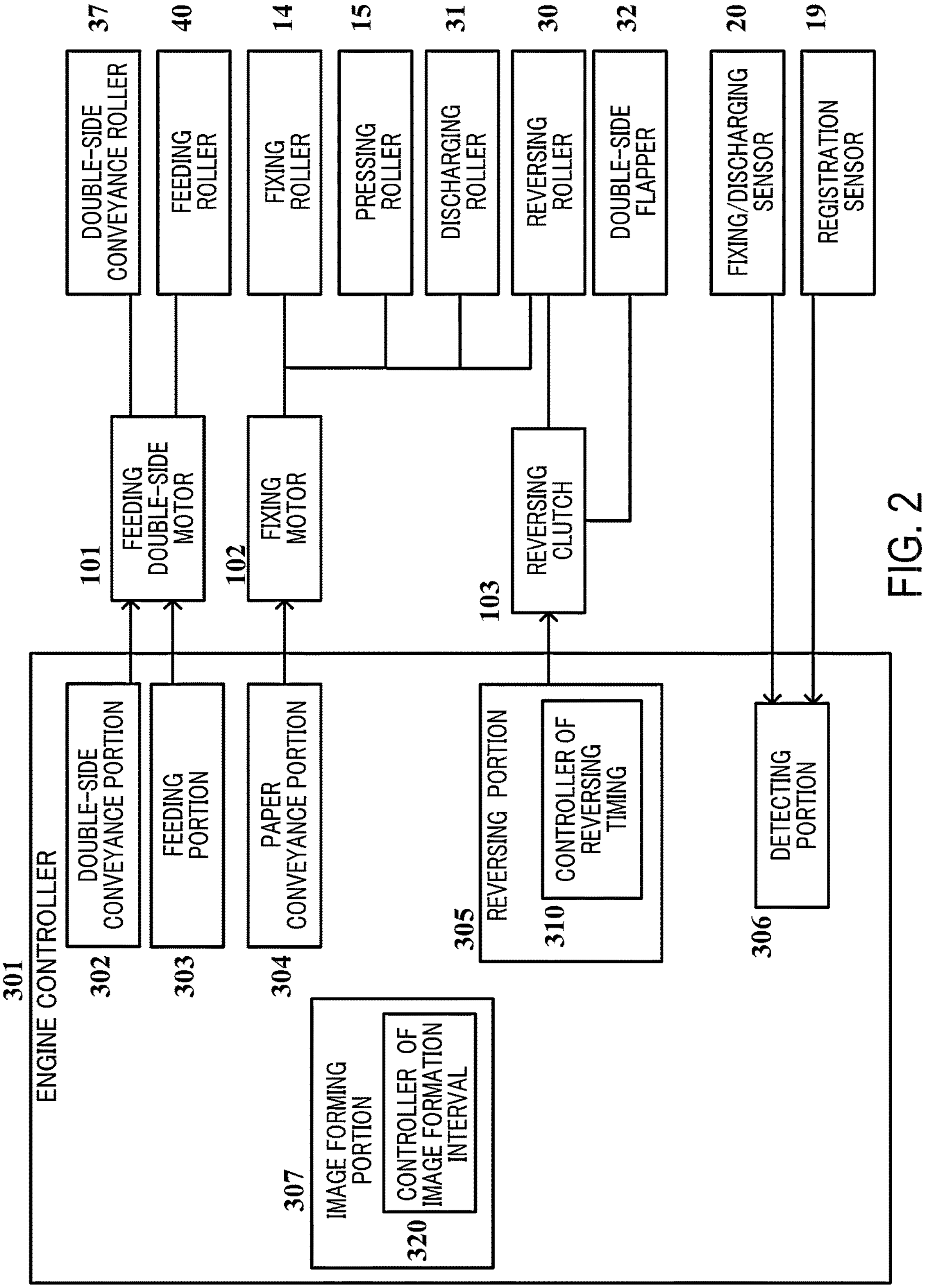
FIG. 2 is a function block diagram in the Embodiment 1.

FIG. 2 is a function block diagram illustrating a functional configuration in the Embodiment 1. The engine control portion 301 performs the image formation with an image forming portion 307. The image forming portion 307 determines a timing for performing the image formation according to an image interval determined by an image forming interval control portion 320. A sheet feeding portion 303 performs instruction for rotation to a double-side sheet feeding motor 101 to cause a sheet feeding roller 40 to be rotated to feed the sheet 2 from a cassette 1. Onto the fed sheet 2, the image formed by the image forming portion 307 is transferred. A paper conveyance portion 304 performs instruction for rotation to the fixing motor 102 to cause the fixing roller 14, the pressing roller 15 and the discharging roller 31 to be rotated to convey the sheet 2 to the discharge tray 27.

Next, each function in the double-side conveyance control upon performing printing on the front surface and the back surface of the sheet 2 will be described. By turning on the reversing clutch 103, a position of the double-side flapper 32 is switched and the sheet 2 is conveyed in a double-side reversing path 29 direction. A detecting portion 306 detects the leading end of the sheet 2 by the registration sensor 19 as a first detecting unit (detecting unit). Based on a time difference with the image forming timing determined by the image forming interval control portion 320, the sheet feeding portion 303 determines whether speed changing of the double-side sheet feeding motor 101 is needed or not and, if determined to be needed, a timing for the speed changing.

The detecting portion 306 detects the trailing end of the sheet 2 with the fixing and discharging sensor 20 as a second detecting unit (detecting unit), a reversing timing control portion 310 determines a reversing timing, and a reversing portion 305 turns off the reversing clutch 103. By this, the sheet 2, which is conveyed in the double-side reversing path 29 direction, is conveyed to the double-side conveyance path 33. The reversing roller 30 is rotated by the fixing motor 102 as a driving source in a double-side conveyance path 33 direction when the reversing clutch 103 is turned off, and is rotated in the double-side reversing path 29 direction when the reversing clutch 103 is turned on. In other words, the reversing roller 30 conveys the sheet 2 in the same direction as the previous conveyance direction when the reversing clutch 103 is turned on, and conveys the sheet 2 in the opposite direction to the previous conveyance direction when the reversing clutch 103 is turned off.

The double-side flapper 32 switches the conveyance path to a discharge tray 27 direction when the reversing clutch 103 is turned off (broken line in FIG. 1), and switches the conveyance path to the double-side reversing path 29 direction when the reversing clutch 103 is turned on (solid line in FIG. 1). The double-side conveyance portion 302 rotates the double-side conveyance roller 37 by performing instruction for rotation to the double-side sheet feeding motor 101, and conveys the sheet 2 in a state in which the front and the back thereof is reversed to the printing conveyance path 25 again.

(Flowchart: A Case in which Control in the Embodiment 1 is not Executed)

First, an example of an operation upon the double-side printing by the engine control portion 301 in a case in which control in the Embodiment 1 is not executed will be described using a flowchart in FIG. 3A. In step 1010 (hereinafter referred to as "S1010"), the engine control portion 301 determines whether a double-side print instruction is received or not. In S1010, if the engine control portion 301 determines that the double-side print instruction is not received, then proceeds the process back to S1010, and if the engine control portion 301 determines that the double-side print instruction is received, then proceeds the process to S1020. In S1020, the engine control portion 301 drives the fixing motor 102 and the double-side sheet feeding motor 101 as a preparatory operation for the sheet conveyance. In S1030, the engine control portion 301 starts a preparatory operation for the image formation with the image forming portion 307. When the preparation for the image formation is completed, in S1035, the engine control portion 301 determines whether preparation of the image data for a first side of the double-side printing is completed or not. In S1035, if the engine control portion 301 determines that the preparation of the image data is not completed, then proceeds the process back to S1035, and if the engine control portion 301 determines that the preparation of the image data is completed, then proceeds the process to S1040. In S1040, the engine control portion 301 starts the image formation for the first side.

In S1050, the engine control portion 301 determines whether a time X, after which a sheet feeding operation for the first side of the double-side printing is started, has elapsed or not using a start time of the image formation in S1040 as a reference. In parallel, in S1051, the engine control portion 301 determines whether a time Y, after which the image formation for a second side of the double-side printing is started, has elapsed or not. Incidentally, since the engine control portion 301 performs monitoring of S1050 and S1051 in parallel, respectively, processes after S1040 is split as illustrated in FIG. 3A.

Here, the time X in the Embodiment 1 is determined in advance by the following equation.

Time Xi: An ideal time for the toner image formed by the image forming portion 307 to reach the secondary transfer roller 9

Time Xp: An ideal time for the sheet 2 fed from the sheet feeding portion 303 to reach the secondary transfer roller 9

$$\text{Time } X = Xi - Xp$$

Incidentally, since the printer 200 in the Embodiment 1 has relationship of Xi>Xp, the sheet feeding operation for the corresponding sheet 2 is started after the image formation is started.

In addition, the time Y in the Embodiment 1 is determined in advance by the following equation.

Time Yp1: An ideal time for the leading end of the sheet of the first side to reach a reversing position from the secondary transfer roller 9

Time Yp2: An ideal conveyance time for a sheet length reserved at the time of printing Time Yp3: An ideal time for the leading end of the sheet of the second side to reach the secondary transfer roller 9 from the reversing position.

$$\text{Time } Y = Yp1 + Yp2 + Yp3$$

Return to the description for the flowchart. In S1050, if the engine control portion 301 determines that the time X has not elapsed, then proceeds the process back to S1050, and if the engine control portion 301 determines that the time X has elapsed, then proceeds the process to S1060. In S1060, the engine control portion 301 starts the sheet feeding operation for the first side of the double-side printing. In S1051, if the engine control portion 301 determines that the time Y has not elapsed, then proceeds the process back to S1051, and if the engine control portion 301 determines that the time Y has elapsed, then proceeds the process to S1052. In S1052, the engine control portion 301 determines whether the preparation of the image data for the second side of the double-side printing is completed or not. In S1052, if the engine control portion 301 determines that the preparation is not completed, then proceeds the process back to S1052, and if the engine control portion 301 determines that the preparation is completed, then proceeds the process to S1053. In S1053, the engine control portion 301 starts the image formation for the second side and proceeds the process to S1140. In this manner, the image formation for the second side of the double-side printing is started in parallel with the conveyance operation for the first side of the double-side printing, which is proceeding as the sheet feeding operation is started.

In S1070, the engine control portion 301 determines whether the leading end of the sheet for the first side (front surface) of the double-side printing has reached the registration sensor 19 or not. In S1070, if the engine control portion 301 determines that the leading end of the sheet has not reached the registration sensor 19, then proceeds the process back to S1070, and if the engine control portion 301 determines that the leading end of the sheet reached the registration sensor 19, then proceeds the process to S1080. In S1080, the engine control portion 301 executes accelerating/decelerating/pausing control.

(Accelerating/Decelerating/Pausing Control)

Here, by using FIG. 3B, the accelerating/decelerating/pausing control in S1080 will be described. In the accelerating/decelerating/pausing control, the sheet 2 is conveyed a predetermined distance from the registration roller 3 to the secondary transfer roller 9 with the same time as a remaining time by which the toner image reaches the secondary transfer roller 9. Therefore, the engine control portion 301 accelerates, decelerates or pauses (temporarily stops) the double-side sheet feeding motor 101, and returns a rotation speed of the double-side sheet feeding motor 101 so that the sheet 2 and the toner image have the same conveyance speed when the leading end of the sheet 2 reaches the secondary transfer roller 9.

In S2010, the engine control portion 301 calculates a misaligned amount between a leading end position of the image and a leading end position of the sheet based on a difference between the time when the image formation is started and the time when the leading end of the sheet is reached the registration sensor 19. In S2020, the engine control portion 301 determines whether the misaligned amount can be eliminated or not within a range of accelerating/decelerating performance of the double-side sheet feeding motor 101. In S2020, if the engine control portion 301 determines that the misaligned amount can be eliminated, then proceeds the process to S2030. In S2030, the engine control portion 301 calculates a target speed of the double-side sheet feeding motor 101 and a maintaining time Ta for which the target speed is maintained. In S2040, the engine control portion 301 changes the speed of the double-side sheet feeding motor 101.

In S2050, the engine control portion 301 determines whether the maintaining time Ta has elapsed or not since the speed changing of the double-side sheet feeding motor 101. In S2050, if the engine control portion 301 determines that the maintaining time Ta has not elapsed, then proceeds the process back to S2050, and if the engine control portion 301 determines that the maintaining time Ta has elapsed, then proceeds the process to S2060. In S2060, the engine control portion 301 changes the speed of the double-side sheet feeding motor 101 to the same speed as the toner image, and ends the accelerating/decelerating/pausing control. In a case in which the processes of S2030 through S2060 are performed, it is possible to align the timing when the toner image and the leading end of the sheet reach the secondary transfer roller 9.

On the other hand, in S2020, if the engine control portion 301 determines that the misaligned amount cannot be eliminated, then proceeds the process to S2031. In S2031, the engine control portion 301 determines that the print is a misprint since the accelerating/decelerating/pausing control cannot align the timing when the toner image and the leading end of the sheet reach the secondary transfer roller 9. In this case, the engine control portion 301 ends the process without changing the speed of the double-side sheet feeding motor 101.

Figure 3A:
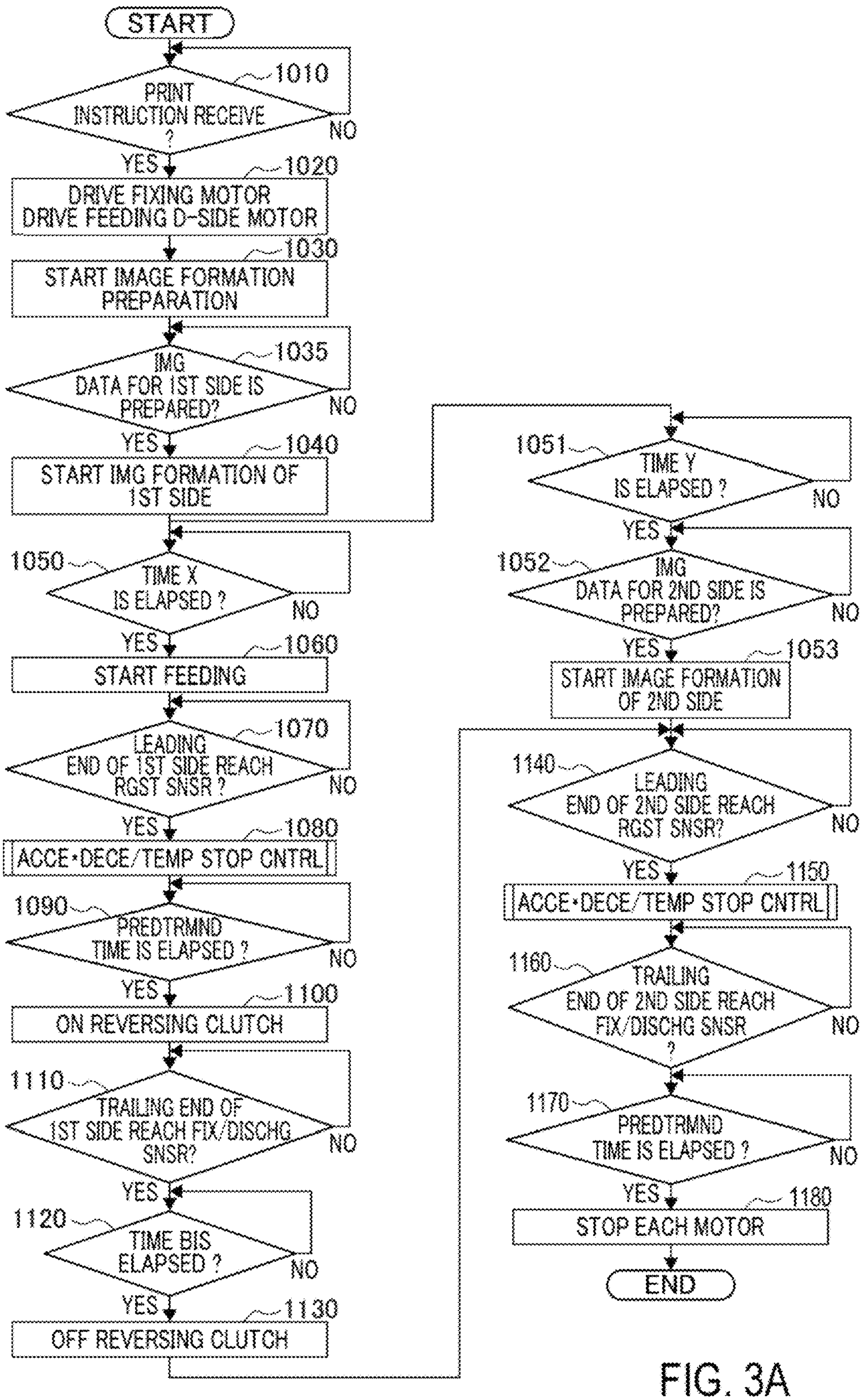
FIG. 3A is a flowchart in a case in which conveyance control in the Embodiment 1 is not executed.
Figure 3B:
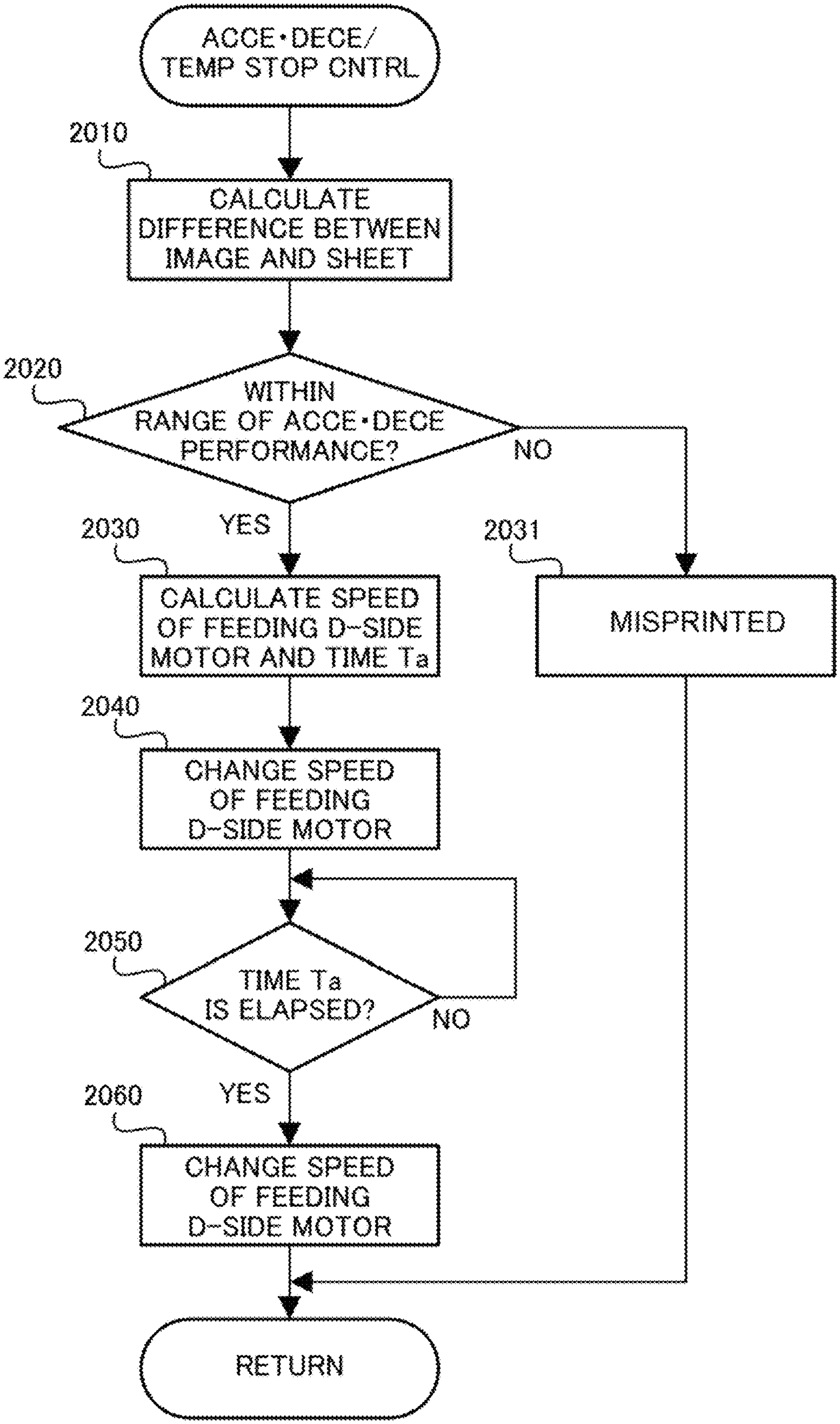
FIG. 3B is a flowchart illustrating accelerating/decelerating/pausing control in the Embodiment 1.

Return to the flowchart in FIG. 3A. In S1080, after ending the accelerating/decelerating/pausing control and as the sheet conveyance is continued, the leading end of the sheet S onto which the toner image has been transferred approaches the reversing position of the sheet downstream of the fixing device 13. The engine control portion 301 performs the following process in S1090 to convey the sheet 2 for the first side of the double-side printing to the reversing portion until the leading end of the sheet reaches a conveyance path junction point with the double-side flapper 32. That is, in S1090, the engine control portion 301 determines whether a predetermined time has elapsed or not since the end of accelerating/decelerating/pausing control. In S1090, if the engine control portion 301 determines that the predetermined time has not elapsed, then proceeds the process back to S1090, and if the engine control portion 301 determines that the time has elapsed, then proceeds the process to S1100.

In S1100, the engine control portion 301 operates the reversing clutch 103, specifically turning on the reversing clutch 103 to switch the position of the double-side flapper 32 and the rotational direction of the reversing roller 30. As a result, the double-side flapper 32 switches the conveyance path to the double-side reversing path 29 direction (solid line in FIG. 1), and the reversing roller 30 conveys the sheet 2 in the same direction as the previous conveyance direction. In S1110, the engine control portion 301 determines whether the trailing end of the sheet 2 has reached the fixing and discharging sensor 20 or not after the leading end of the sheet entered the reversing portion. In S1110, if the engine control portion 301 determines that the trailing end of the sheet has not reached the fixing and discharging sensor 20, then proceeds the process back to S1110, and if the engine control portion 301 determines that the trailing end of the sheet has reached the fixing and discharging sensor 20, then proceeds the process to S1120.

In order to start drawing the sheet 2 into the double-side conveyance path 33 by reversing the conveyance direction for the first side of the double-side printing, in S1120, the engine control portion 301 determines whether a time B has elapsed from the timing when the trailing end of the sheet S reaches the fixing and discharging sensor 20. In 1120, if the engine control portion 301 determines that the time B has not elapsed, then proceeds the process back to S1120, and if the engine control portion 301 determines that the time B has elapsed, then proceeds the process to S1130.

In S1130, the engine control portion 301 operates the reversing clutch 103, specifically turning off the reversing clutch 103 to switch the position of the double-side flapper 32 and the rotational direction of the reversing roller 30. As a result, the double-side flapper 32 switches the conveyance path to the double-side conveyance path 33 direction (broken line in FIG. 1), and the reversing roller 30 conveys the sheet 2 in the opposite direction to the previous conveyance direction. Incidentally, the time B in S1120 in the Embodiment 1 is set in advance to reverse the conveyance direction of the sheet 2 with aiming at a timing when a position of the trailing end of the sheet 2 for the first side of the double-side printing reaches a position upstream of the reversing roller 30 by 15 mm, for example.

When the conveyance direction of the sheet 2 is switched, the trailing end of the sheet for the first side of the double-side printing becomes the leading end of the sheet for the second side of the double-side printing and passes through the double-side conveyance path 33. In S1140, the engine control portion 301 determines whether the leading end of the sheet for the second side (back surface) of the double-side printing has reached the registration sensor 19 or not. In S1140, if the engine control portion 301 determines that the leading end of the sheet has not reached the registration sensor 19, then proceeds the process back to S1140, and if the engine control portion 301 determines that the leading end of the sheet reached the registration sensor 19, then proceeds the process to S1150. In S1150, the engine control portion 301 executes the accelerating/decelerating/pausing control, which is described with using FIG. 3B, again. After the accelerating/decelerating/pausing control is completed, in S1160, the engine control portion 301 determines whether the trailing end of the sheet for the second side of the double-side printing has reached the fixing and discharging sensor 20 or not. In S1160, if the engine control portion 301 determines that the trailing end of the sheet has not reached the fixing and discharging sensor 20, then proceeds the process back to S1160, and if the engine control portion 301 determines that the trailing end of the sheet has reached the fixing and discharging sensor 20, then proceeds the process to S1170.

In S1170, the engine control portion 301 determines whether a predetermined time, which is sufficient for discharging the second side of the double-side printing to the discharge tray 27, has elapsed or not. In S1170, if the engine control portion 301 determines that the predetermined time has not elapsed, then proceeds the process back to S1170, and if the engine control portion 301 determines that the predetermined time has elapsed, then proceeds the process to S1180. In S1180, the engine control portion 301 stops the operations of the double-side sheet feeding motor 101, the fixing motor 102 and the image forming portion 307 to terminate the print operation. As such, the fixing motor 102 is maintained in a state of being driven from a time when the driving is started in S1020 until the driving is stopped in S1180.

(Problems in the Control in FIG. 3A)

Here, problems which arise in the example of the operation in FIG. 3A will be described. There is a case in which the printer 200 performs the print operation in a universal size mode, in which sheet size specification by a user is omitted. In the universal size mode, the printer is operated with timings assuming a largest size of the sheet in order to be operated properly with all sizes of the sheet from a smallest size to the largest size which can be printed by the printer 200. However, in the case in which the print operation is performed in the universal size mode, the sheets of various sizes different from the largest size are actually used. In addition, the user of the printer 200 may set and use the sheet having a size different from the print instruction to the apparatus due to an operational error or misunderstanding, etc. Furthermore, due to variations in sheet production, some sheets may have sizes different from a specified size.

For example, the printer 200 in the Embodiment 1 supports a leisure size sheet (width 279.4 mm× length 431.8 mm) as the largest sheet size for the double-side printing. Assume a case in which, upon executing the double-side printing with the printer 200, the universal size mode is specified in S1010 described above, and a legal size sheet (width 215.9 mm× length 355.6 mm), which is smaller than the leisure size, which is the largest sheet size, is set and used. In this case, in S1110, the trailing end of the sheet for the first side reaches the fixing and discharging sensor 20 earlier, and the reversing roller 30 upon the switchback continues to be rotated almost without pausing. Therefore, the leading end for the second side of the double-side printing after reversing the conveyance direction reaches the registration sensor 19 earlier as well.

Meanwhile, the engine control portion 301 starts the formation of the toner image on the second side when the time Y elapsed, which is determined based on the sheet length of the leisure size, which is the largest sheet size, according to the instruction of the universal size mode (YES in S1051). As a result, when the leading end of the sheet for the second side of the double-side printing reaches the registration sensor 19, the remaining time, by which the toner image for the second side of the double-side printing reaches the secondary transfer roller 9, becomes long. The shorter the length of the sheet size, which is actually used, than the sheet size, which is assumed when the print instruction is given, the larger the misaligned amount between the toner image and the sheet, which is calculated in the accelerating/decelerating control in S1150 (S2010). Therefore, in the accelerating/decelerating/pausing control for the second side of the double-side printing, the pausing comes to be selected.

Next, distance relationship between the roller pairs and the sensors of the printer 200 in the Embodiment 1 will be described. A conveyance distance from the registration roller 3 to the registration sensor 19 is 1 mm and a conveyance distance from the reversing roller 30 to the registration roller 3 is 350 mm. Therefore, in the case in which the double-side printing is performed onto the legal size sheet, when the leading end of the sheet for the second side reaches the registration sensor 19, the trailing end of the sheet for the second side is still held by the reversing roller 30.

In other words, when the registration roller 3 is paused or decelerated by the accelerating/decelerating/pausing control for the second side of the double-side printing, due to a difference in speed between the reversing roller 30, whose driving source is the fixing motor 102, and the registration roller 3, the trailing end side of the sheet for the second side is pushed into the double-side conveyance path 33. By this, a possibility of occurrence of problems such as buckling and/or jamming of the sheet 2 during the conveyance is increased.

In addition, in a case in which the reversing roller 30 is paused or decelerated in conjunction with the accelerating/decelerating/pausing control for the second side to avoid the buckling and/or jamming of the sheet 2, the fixing motor 102 also needs to be paused or decelerated. In this case, fixing performance of the toner image for the second side may be reduced since heat uniformity in the rotational direction of the fixing roller 14 is lost due to the speed fluctuation of the fixing roller 14. Therefore, the pausing or the decelerating of the fixing motor 102 is not desirable.

(Flowchart: A Case in which the Control in the Embodiment 1 is Executed)

Figure 4A:
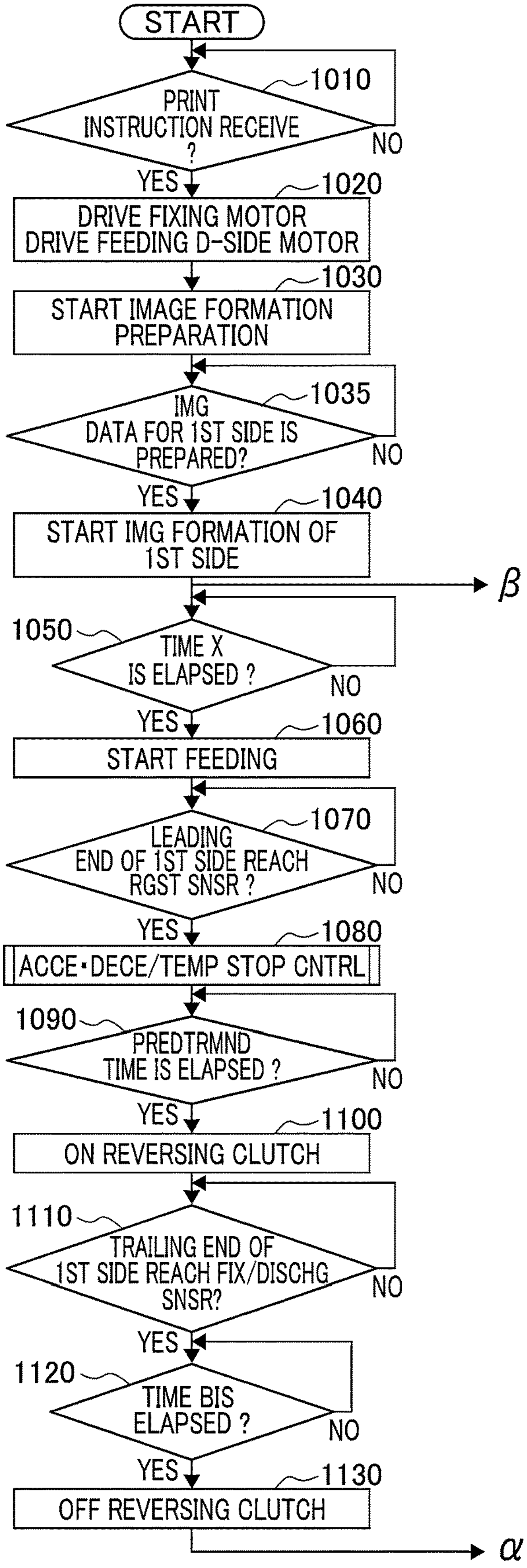
FIG. 4A and FIG. 4B are flowcharts in a case in which the conveyance control in the Embodiment 1 is executed.
Figure 4B:
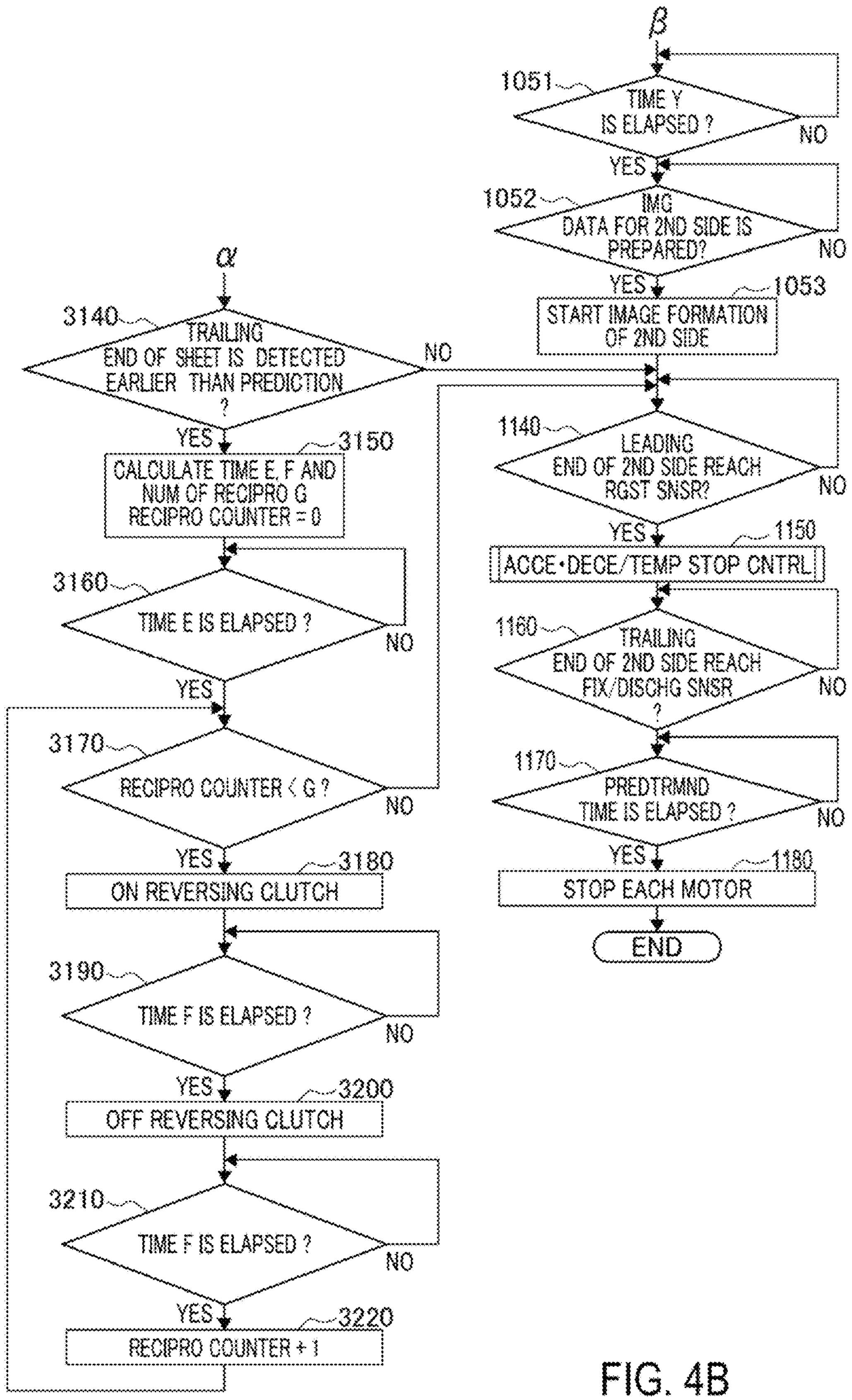

Next, operation upon the double-side printing by the engine control portion 301 in a case in which the control in the Embodiment 1 is executed will be described using flowcharts in FIG. 4A and FIG. 4B. Processes from S1010 through S1130 and S1051 through S1053 in the flowcharts in FIG. 4A and FIG. 4B are the same as those from S1010 through S1130 and S1051 through S1053 in the flowchart in FIG. 3A, therefore description thereof will be omitted.

The engine control portion 301 calculates a scheduled timing Tp (predicted timing) when the trailing end of the sheet reaches the fixing and discharging sensor 20 using the following equation with reference to the start time of the image formation.

Time Xi: An ideal time for the toner image formed by the image forming portion 307 to reach the secondary transfer roller 9

Time Xf: An ideal time for the leading end of the sheet onto which the toner image is transferred to reach from the secondary transfer roller 9 to the fixing and discharging sensor 20

Time Yp2: An ideal conveyance time for the sheet length assumed upon the print instruction $$\text{Scheduled timing } Tp = Xi + Xf + Yp2$$

Here, the time Xf is the ideal time based on a distance between the secondary transfer roller 9 and the fixing and discharging sensor 20, the conveyance speed of the sheet 2 and the length of the sheet 2 in the conveyance direction acquired in S1010.

In S3140, the engine control portion 301 determines whether the trailing end of the sheet is detected earlier than scheduled with respect to the scheduled timing Tp described above or not based on the actual timing Tr in S1110, at which the trailing end of the sheet actually reaches the fixing and discharging sensor 20. The engine control portion 301 predicts whether the sheet 2 reaches the secondary transfer roller 9 earlier based on a difference between the scheduled timing Tp and the actual timing Tr. In S3140, if the engine control portion 301 determines that the trailing end of the sheet is detected earlier than scheduled, then proceeds the process to S3150.

In S3150, the engine control portion 301 calculates a time E, a time F and a number of reciprocating G, and sets a reciprocating counter, which counts reciprocating operations, to 0. Incidentally, the reciprocating operation means that the first control and the second control are alternately repeated for the sheet 2, which is being conveyed through the double-side conveyance path 33, and the sheet 2 is reciprocately moved within the double-side conveyance path 33.

Here, the time E is obtained by the following equation. The time E is a time in which the leading end of the sheet 2, which starts the reversing, reaches just before the double-side conveyance roller 37.

Distance L1: Distance from the reversing roller 30 to the double-side conveyance roller 37 (135 mm)

Distance L2: Distance from the reversing roller 30 to a reversing starting position of the sheet for the second side of the double-side printing (15 mm)

Distance L3: Margin for preventing the sheet 2 from entering into the double-side conveyance roller 37 (10 mm)

$$\text{Time } E = (L1 - (L2 + L3)) / (\text{conveyance speed})$$

In addition, in order to calculate the time F and the number of reciprocating G, a delay time Td (which is also a difference time), for which the conveyance for the second side of the double-side printing is delayed, is calculated by the following equation. The delay time Td is a time to delay a timing in which the leading end of the sheet 2 for the second side reaches the registration roller 3. In addition, the time F is a time for which the first control and the second control are executed, and the number of reciprocating G is a number in which one set of the first control and the second control is counted as one.

$$\text{Delay time } Td = \text{Scheduled timing } Tp - \text{Actual timing } Tr$$

(where a minimum value of Td is 0)

Here, when the time Xf described above is the ideal time Ttp and the actual timing Tr is a detection time Ttd, then the delay time Td can be said to be the difference between the ideal time Ttp and the detection time Ttd.

Furthermore, in order to prevent the sheet 2 from falling (e.g., the sheet 2 is returned too much and falls onto the discharge tray 27, etc.), the number of reciprocating is calculated by the following equation.

$$\text{Number of reciprocating } G = (Td/2)/E$$

(where G is a positive integer rounded up to the nearest whole number)

$$\text{Time } F = Td/(G \times 2)$$

In this manner, the time F (time T1), in which the first control is executed, the time F (time T2), in which the second control is executed, and the number of reciprocating G in the reciprocating control are determined according to the delay time Td. Incidentally, in the Embodiment 1, the first control and the second control are performed for the same time F, however, the first control and the second control may be configured to be performed for different times (T1≠T2). In addition, a time (time T3) from starting the control in S1130 (second control) until starting the reciprocating control in S3180 is at least longer than a half of the delay time Td (T3>Td/2).

In S3160, the engine control portion 301 determines whether the time E has elapsed or not with reference to the timing when the reversing clutch 103 is turned off in S1130. In S3160, if the engine control portion 301 determines that the time E has not elapsed, then proceeds the process back to S3160, and if the engine control portion 301 determines that the time E has elapsed, then proceeds the process to S3170.

In S3170, the engine control portion 301 determines whether the reciprocating counter is less than the number of reciprocating G or not. In S3170, if the engine control portion 301 determines that the reciprocating counter is less than the number of reciprocating G, then proceeds the process to S3180. In S3180, the engine control portion 301 turns on the reversing clutch 103 again. This causes the reversing roller 30 to convey the sheet 2 in the direction to the double-side reversing path 29, i.e., the sheet 2 runs in reverse in the double-side conveyance path 33. In addition, the engine control portion 301 starts the reciprocating control while the second control is being performed.

In S3190, the engine control portion 301 determines whether the time F has elapsed or not with reference to the timing when the reversing clutch 103 is turned on in S3180. In S3190, if the engine control portion 301 determines that the time F has not elapsed, then proceeds the process back to S3190, and if the engine control portion 301 determines that the time F has elapsed, then proceeds the process to S3200. In S3200, the engine control portion 301 turns off the reversing clutch 103. This causes the reversing roller 30 to convey the sheet 2 in the direction to the double-side conveyance path 33, i.e., the sheet 2 is conveyed in the double-side conveyance path 33 toward the registration roller 3.

In S3210, the engine control portion 301 determines whether another time F has been elapsed or not. In S3210, if the engine control portion 301 determines that the other time F has not elapsed, then proceeds the process back to S3210, and if the engine control portion 301 determines that the other time F has elapsed, then proceeds the process to S3220. In the processes from S3180 to this point, the sheet 2 has made one reciprocating in the double-side conveyance path 33 by running in reverse and forward. In S3220, the engine control portion 301 counts up (+1) the reciprocating counter and proceeds the process back to S3170.

In S3170, if the engine control portion 301 determines that the reciprocating counter is the number of reciprocating G or more, then proceeds the process to S1140. In S1140, the engine control portion 301 waits until the leading end of the sheet for the second side of the double-side printing reaches the registration sensor 19. In other words, in the Embodiment 1, the engine control portion 301 executes the processes from S3140 through S3220. By this, the engine control portion 301 performs at least one or more reciprocating operations in which the sheet 2 is reciprocated by switching the rotational direction of the reversing roller 30 twice (S3180, S3200) until the leading end of the sheet for the second side of the double-side printing reaches the double-side conveyance roller 37.

In S3140, if the detection time of the trailing end of the sheet is later than scheduled, then the engine control portion 301 proceeds the process to S1140 and waits for the leading end of the sheet for the second side to reach the registration sensor 19. Since the subsequent processes from S1140 through S1180 are the same as those in S1140 through S1180 in FIG. 3A, the description thereof will be omitted. Incidentally, the reciprocating control is performed before the accelerating/decelerating/pausing control in S1150. In this manner, the engine control portion 301 performs the reciprocating control at least one or more times in the case in which it is predicted that the sheet 2 reaches the secondary transfer roller 9 earlier than the toner image, which is formed when the sheet 2 is being conveyed in the double-side conveyance path 33 and is to be transferred onto the back surface of the sheet 2.

As described above, in the Embodiment 1, the reciprocating operation of the sheet is performed by operating the reversing clutch during the sheet conveyance in the double-side conveyance path in the case in which the length of the sheet, which is actually conveyed, is shorter than the length of the sheet, which is assumed upon the print start. By this, it becomes possible to delay the timing when the leading end of the sheet for the second side of the double-side printing reaches the registration roller. In other words, it becomes possible for the decelerating and the pausing control not to be selected upon the accelerating/decelerating/pausing control for the second side of the double-side printing. By this, it becomes possible to prevent the buckling and/or the jamming due to the trailing end of the sheet for the second side of the double-side printing being pushed into the double-side conveyance path. Since there is no need to change the speed of and/or stop the fixing motor in synchronization with the accelerating/decelerating/pausing control for the second side of the double-side printing, it becomes possible to perform the double-side printing operation with stable image quality.

Modified Example

Incidentally, in the Embodiment 1, for the sake of simplicity of the description, the time E, the time F and the number of reciprocating G, which are calculated by ignoring operating times for switching the conveyance direction by turning the reversing clutch on and off and variation times thereof in view of hardware, are used in the description. However, the time E, the time F and the number of reciprocating G may be calculated by considering these operating times and variation times, which are experimentally obtained.

In addition, in a case in which the conveyance time in the double-side conveyance path varies due to differences in a type of the sheet and environmental conditions, durability deterioration, etc., the time E, the time F, etc. (time T1, T2, T3, etc.) may be corrected by an offset value or a correction coefficient based on the difference in the conveyance time in the double-side conveyance path, which are experimentally obtained.

In addition, in the Embodiment 1, the method for calculating the time E, the time F and the number of reciprocating G using the difference between the ideal time, when the trailing end of the sheet is detected by the fixing and discharging sensor 20, and the actual detection time is described. However, the time E, the time F and the number of reciprocating G may be calculated, for example, based on a difference between a sheet length Lp, which is assumed and reserved in the print start, and an actual sheet length Lr, which is calculated using the sheet detection timing at the registration sensor 19. For example:

$$\text{Difference } Ld = Lp - Lr \text{ (where } a \text{ minimum value of } Ld \text{ is 0)}$$

$$\text{Delay time } Td2 = Ld/\text{(conveyance speed)}$$

$$\text{Time } E \text{ (aforementioned value)}$$

$$\text{Number of reciprocating } G = (Td2/2)/E$$

(where G is a positive integer rounded up to the nearest whole number)

$$\text{Time } F = Td2/(G \times 2)$$

In this manner, for example, the registration sensor 19 is used as a length detecting unit which detects the length of sheet 2 in the conveyance direction. The engine control portion 301 may acquire each value based on a difference in the length between the length of the sheet 2 in the conveyance direction reserved in the print start (Lp) and the length of the sheet 2 in the conveyance direction detected by the registration sensor 19 (Lr). That is, the number of reciprocating G, the first time, in which the first control is executed, and the second time, in which the second control is executed, may be acquired based on the difference in the length of the sheet.

Thus, according to the Embodiment 1, it becomes possible to reduce the occurrence of the buckling and/or the jamming of the sheet even in the case in which it is expected that the reaching of the back surface of the sheet to the transfer portion is earlier than that of the image for the back surface of the double-side printing.

Embodiment 2

Next, an Embodiment 2 to which the present invention can be applied will be described. In the Embodiment 1, the actual timing Tr at which the trailing end of the sheet actually reaches the fixing and discharging sensor 20 is compared to the scheduled timing Tp at which the trailing end of the sheet scheduled to reach the fixing and discharging sensor 20 with reference to the start time of the image formation. The times E and F and the number of reciprocating G are then calculated to delay the timing when the second side of the sheet reaches the registration sensor by making the sheet reciprocate in the double-side conveyance path. In the Embodiment 2, a case in which the image formation for the second side cannot be started at the scheduled time due to a delay in image data generation for the second side, etc. will be described. For such a case, in the Embodiment 2, a mode which deals with a case, in which the time F and the number of reciprocating G cannot be calculated, by making the sheet conveyance reciprocate by using a detecting result of the reversing sensor will be described.

Figure 5:
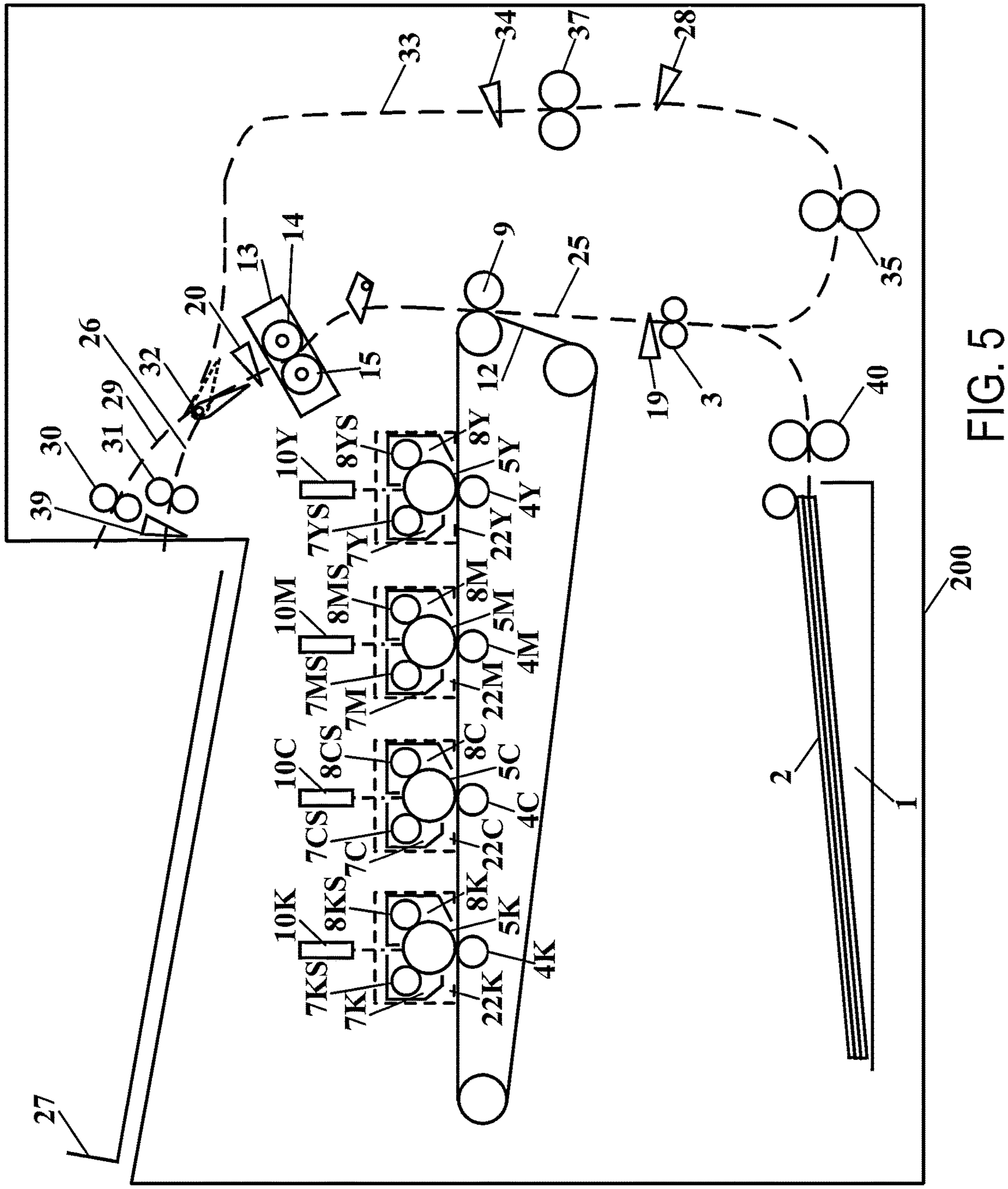
FIG. 5 is a schematic view of a laser printer engine in an Embodiment 2.

An outline of an overall configuration of a printer 200 as an image forming apparatus is shown in FIG. 5. The printer 200 in the Embodiment 2 is further provided with a reversing sensor 34 as a third detecting unit between the reversing roller 30 and the double-side conveyance roller 37, which can detect the leading end and the trailing end of the sheet 2 after reversing. The engine control portion 301 predicts that the sheet 2 will reach the secondary transfer roller 9 earlier based on a detecting result by the reversing sensor 34. The rest is the same as in the Embodiment 1, therefore description thereof will be omitted. Incidentally, the image forming apparatus is not limited to the configuration shown in FIG. 5, as long as the image forming apparatus is capable of the double-side printing.

(Function Block Diagram)

Figure 6:
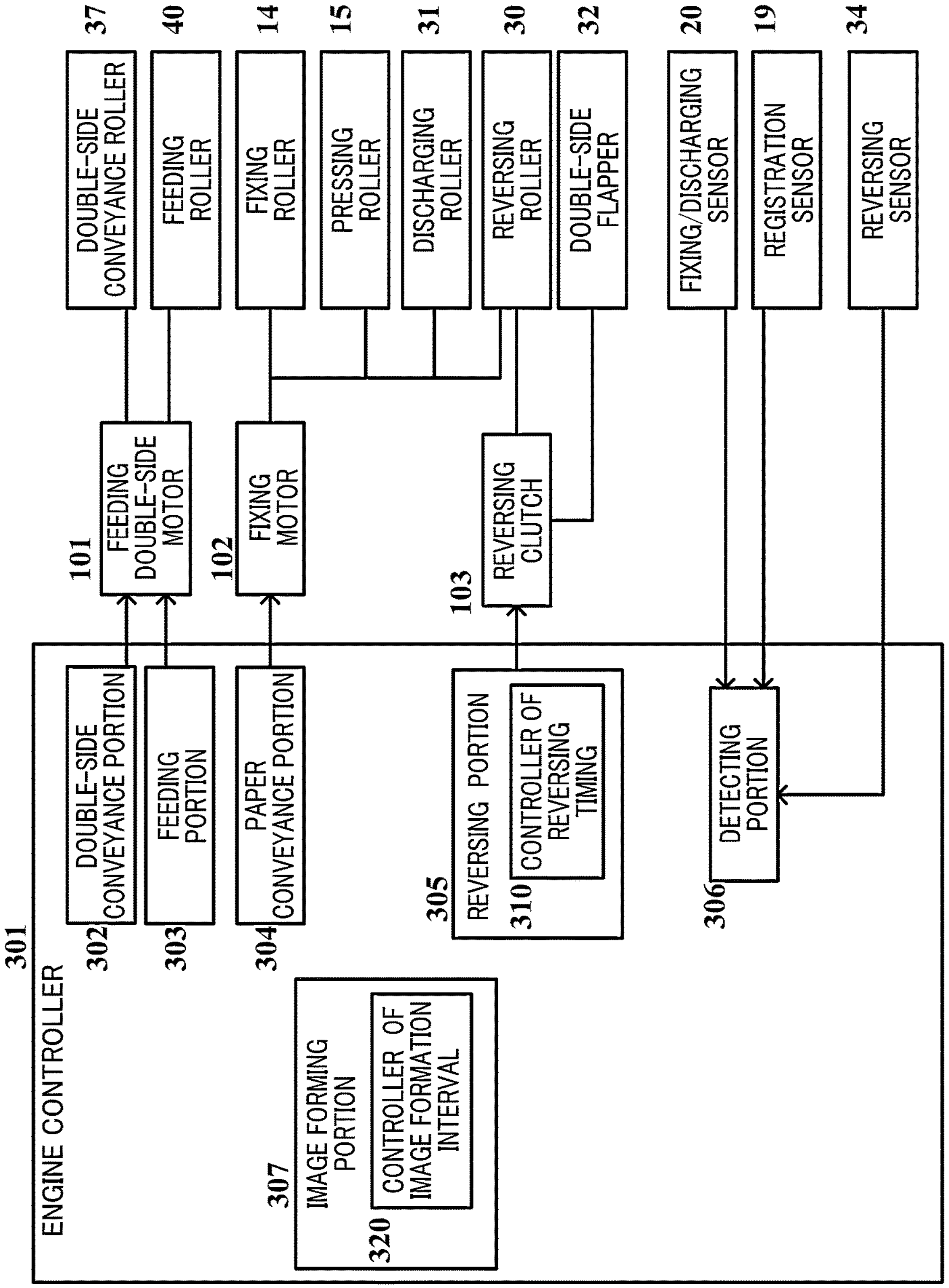
FIG. 6 is a function block diagram in the Embodiment 2.

FIG. 6 is a function block diagram illustrating a functional configuration in the Embodiment 2. The reversing sensor 34 allows a detecting portion 306 to detect the leading end and the trailing end of the sheet 2. The rest is the same as in the Embodiment 1, therefore description thereof will be omitted.

(Flowchart: A Case in which Control in the Embodiment 2 is Executed)

Figure 7A:
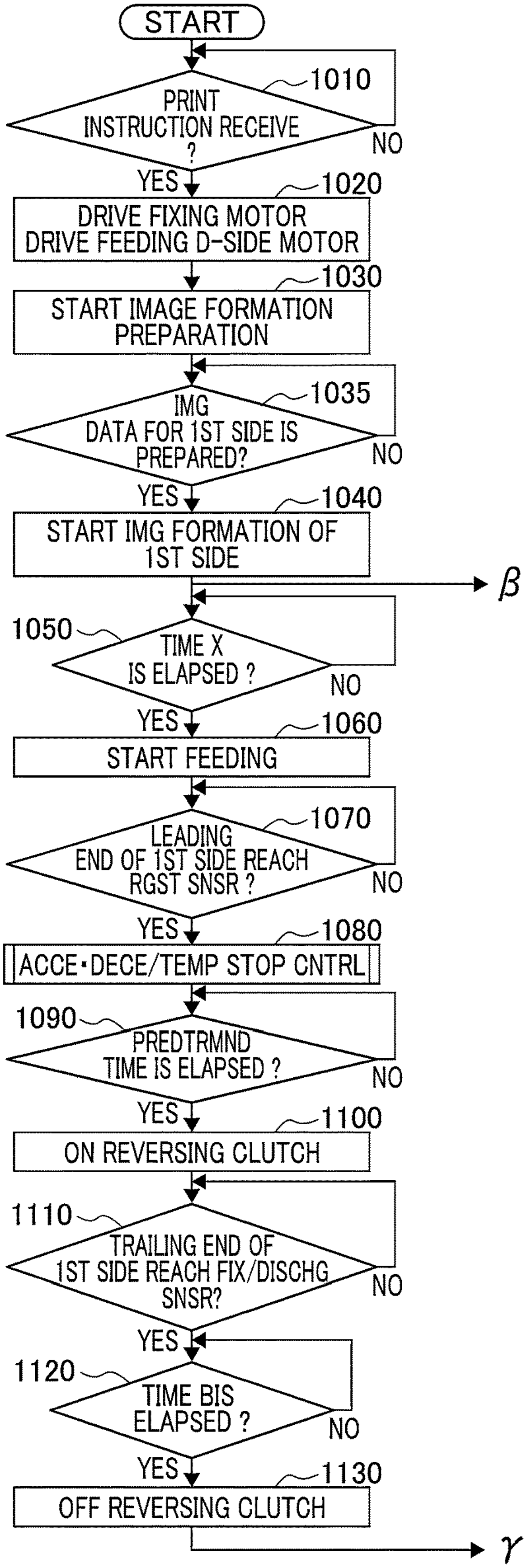
FIG. 7A and FIG. 7B are flowcharts in a case in which a conveyance control in the Embodiment 2 is executed.
Figure 7B:
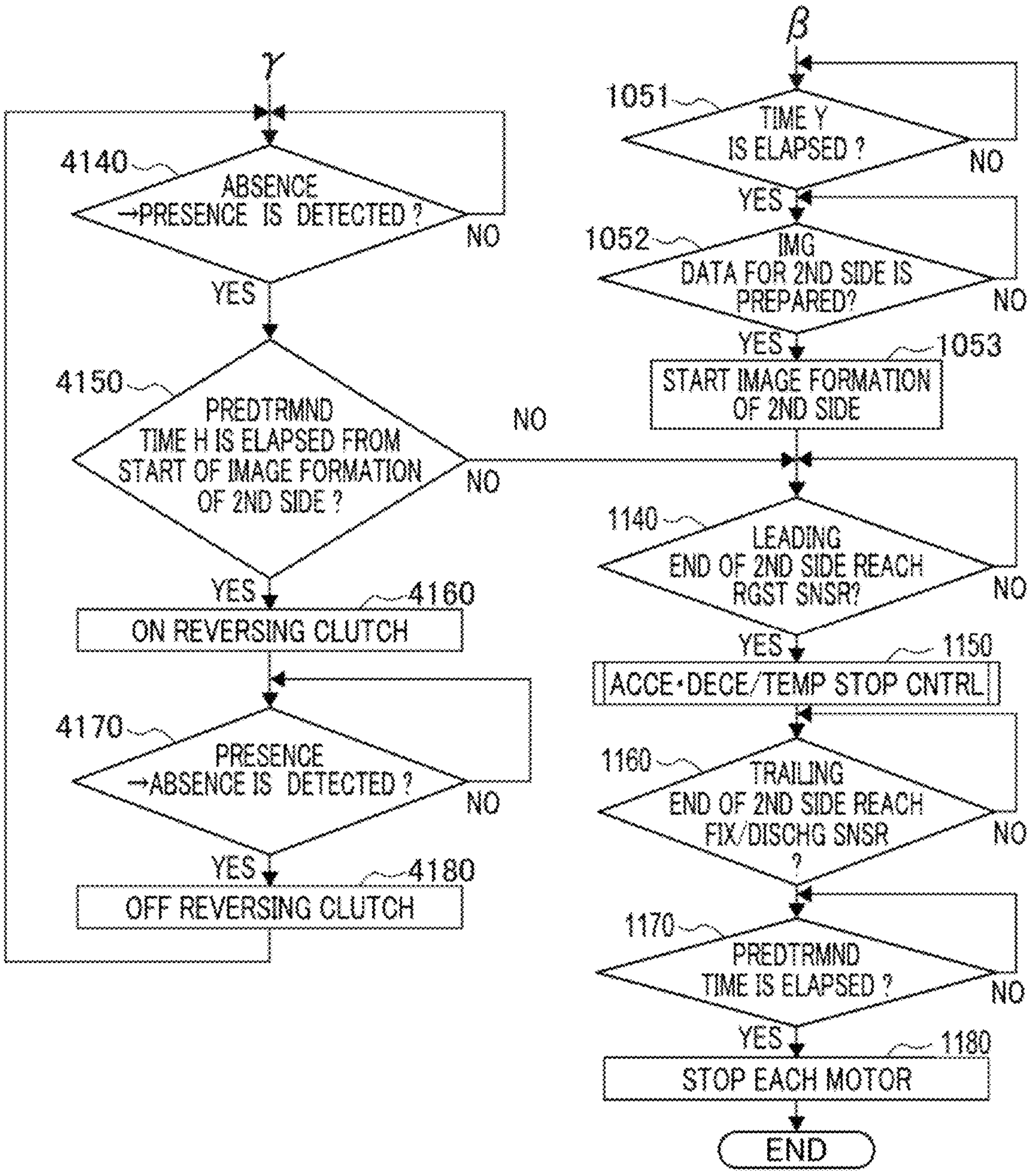

Next, operation upon the double-side printing by the engine control portion 301 in a case in which control in the Embodiment 2 is executed will be described using flowcharts in FIG. 7A and FIG. 7B. The processes from S1010 through S1130 and from S1051 through S1053 in the flowcharts in FIG. 7A and FIG. 7B are the same as those from S1010 through S1130 and from S1051 through S1053 in the flowchart in FIG. 3A, therefore description thereof will be omitted.

After the leading end of the sheet for the second side of the double-side printing enters the double-side conveyance path 33 due to the reversing clutch 103 being turned off in S1130, in S4140, the engine control portion 301 determines whether the leading end of the sheet for the second side is detected by the reversing sensor 34 ("absence of sheet"→"presence of sheet") or not. In S4140, if the engine control portion 301 determines that the leading end of the sheet is not detected by the reversing sensor 34, then proceeds the process back to S4140, and if the engine control portion 301 determines that the leading end of the sheet is detected, then proceeds the process to S4150.

In S4150, the engine control portion 301 determines whether a time elapsed since the start of the image formation for the second side is less than a time H, which is calculated in advance. In S4150, if the engine control portion 301 determines that the elapsed time from the start of the image formation for the second side is less than the time H, then proceeds the process to S4160. In S4160, the engine control portion 301 turns on the reversing clutch 103 again. This causes the reversing roller 30 to convey the sheet 2 in the direction to the double-side reversing path 29, i.e., the sheet 2 runs in reverse in the double-side conveyance path 33. The engine control portion 301 repeatedly executes the reciprocating control from the start of the image formation of the toner image, which is to be formed on the back surface until a predetermined time (time H) (third time), which is determined in advance, has elapsed.

Incidentally, the time His obtained by the following equation.

Time Xi: An ideal time for the toner image formed by the image forming portion 307 to reach the secondary transfer roller 9

Time Xf: An ideal time for the leading end of the sheet onto which the toner image is transferred to reach from the secondary transfer roller 9 to the fixing and discharging sensor 20

Time Xb: Time B described in the Embodiment 1

Time Yp2: An ideal conveyance time for the sheet length assumed upon the print instruction Time Ys: Ideal conveyance time, from a position downstream of the reversing roller 30 by 15 mm to the reversing sensor 34

$$\text{Time } H = Xi + Xf + Xb + Yp2 + Ys$$

While the reversing clutch 103 is turned on and the second side of the sheet is running in reverse in the double-side conveyance path 33, the engine control portion 301 performs the following process. In S4170, the engine control portion 301 determines whether the detecting result of the reversing sensor 34 is changed from "presence of sheet" to "absence of sheet" in order to wait for a timing when the leading end of the sheet for the second side reaches upstream of the reversing sensor 34. In S4170, if the engine control portion 301 determines that the reversing sensor 34 is detecting the sheet, then proceeds the process back to S4170, and if the engine control portion 301 determines that the detecting result of the reversing sensor 34 has changed from "presence of sheet" to "absence of sheet", then proceeds the process to S4180. In S4180, the engine control portion 301 switches the conveyance direction of the sheet 2 for the second side to the drawing direction to the double-side conveyance path 33 by turning off the reversing clutch 103, and proceeds the process back to S4140, and waits again until the leading end of the sheet for the second side reaches the position of the reversing sensor 34.

In S4150, if the engine control portion 301 determines that the time H has elapsed since the start of the image formation for the second side, then the engine control portion 301 proceeds the process to S1140, and waits for the leading end of the sheet for the second side to reach the registration sensor 19. Subsequent processes from S1140 through S1180 are the same as those from S1140 through S1180 in the flowchart in FIG. 3A, therefore description thereof will be omitted.

As described above, in the case in which the image formation for the second side of the double-side printing has not yet started at the timing when the leading end of the sheet for the second side of the double-side printing reaches the position of the reversing sensor 34, the reversing clutch 103 is repeatedly turned on and off with reference to the reversing sensor 34. In addition, even in the case in which the timing when the image formation for the second side is started is unknown, the reversing clutch 103 is repeatedly turned on and off with respect to the reversing sensor 34 provided in the double-side conveyance path. By this, it becomes possible to delay the timing when the leading end of the sheet for the second side of the double-side printing reaches the registration roller 3. In other words, it becomes possible for the decelerating and the pausing control not to be selected upon the accelerating/decelerating/pausing control for the second side of the double-side printing. By this, it becomes possible to prevent the buckling and/or the jamming due to the trailing end of the sheet for the second side of the double-side printing being pushed into the double-side conveyance path. Since there is no need to change the speed of and/or stop the fixing motor in synchronization with the accelerating/decelerating/pausing control for the second side of the double-side printing, it becomes possible to perform the double-side printing operation with stable image quality.

Incidentally, in the Embodiment 2, for the sake of simplicity of the description, the method in which the sheet in the double-side conveyance path is made reciprocate by turning the reversing clutch 103 on and off at the timing of switching on and off of the reversing sensor 34 is described. However, there may be a problem in auditory sensation (effect from operation noise) due to increasing number of operations of the clutching mechanism, effect from decreasing life of the clutching mechanism, or the like. In such cases, for example, the ON/OFF cycle of the reversing clutch 103 may be extended by providing a waiting period, which is a predetermined time or more, between ON and OFF or between OFF and ON of the reversing clutch 103. In addition, in a case in which the conveyance time in the double-side conveyance path varies due to the differences in the type of the sheet and environmental conditions, durability deterioration, etc., the predetermined time to extend the ON/OFF cycle may be corrected by an offset value or a correction coefficient based on the difference in the conveyance time in the double-side conveyance path, which are experimentally obtained.

Thus, according to the Embodiment 2, it becomes possible to reduce the occurrence of the buckling and/or the jamming of the sheet even in the case in which it is expected that the reaching of the back surface of the sheet to the transfer portion is earlier than that of the image for the back surface of the double-side printing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-171146 filed on Oct. 2, 2023, which is hereby incorporated by reference herein in its entirety.

What is claimed is:

1. An image forming apparatus comprising:

an image forming unit configured to form a toner image;

a transfer unit configured to transfer the toner image formed by the image forming unit in a transfer portion;

a fixing unit configured to perform a fixing process to an unfixed toner image on a recording material;

a first rotatable member configured to convey the recording material to the image forming unit in a conveyance direction as a first direction;

a second rotatable member provided downstream of the fixing unit in the first direction;

a driving source configured to drive the fixing unit and the second rotatable member;

a detecting unit provided between the first rotatable member and the second rotatable member and configured to detect a leading end and a trailing end of the recording material; and a control unit configured to (1) determine an actual length of the recording material in the first direction based on a detection result of the detecting unit and (2) switch between a first control in which the second rotatable member is controlled so as to convey the recording material in the first direction and a second control in which the second rotatable member is controlled so as to convey the recording material in a second direction opposite to the first direction, wherein in performing a double-side printing in which an image is formed on a first side and a second side different from the first side of the recording material, the control unit is capable of conveying the recording material to the transfer portion again by switching the second rotatable member from the first control to the second control and conveying the recording material to a double-side conveyance path, and wherein the control unit performs a reciprocating control in which the first control and the second control are alternately switched at least one time when the recording material is being conveyed in the double-side conveyance path based on a determination by the control unit that the actual length of the recording material which is determined is shorter than a length of the recording material in the conveyance direction reserved in a print start.

2. The image forming apparatus according to claim 1, wherein the control unit starts the reciprocating control while performing the second control after completing the fixing process to the first side.

3. The image forming apparatus according to claim 1, wherein the detecting unit includes (1) a first detecting unit provided upstream of the image forming unit in the first direction and (2) a second detecting unit provided downstream of the fixing unit in the first direction.

4. The image forming apparatus according to claim 3, wherein the control unit predicts whether or not the recording material reaches the transfer portion earlier than the toner image or not based on a time difference between (1) a predicted timing, based on a distance between the image forming unit and the second detecting unit, a conveyance speed of the recording material, and a length of the recording material in the conveyance direction, to detect the trailing end of the recording material by the second detecting unit, and (2) an actual timing when the trailing end of the recording material is actually detected by the second detecting unit.

5. The image forming apparatus according to claim 4, wherein the control unit acquires a number of performing the reciprocating control, a first time when the first control is performed in the reciprocating control, and a second time when the second control is performed in the reciprocating control based on the time difference.

6. The image forming apparatus according to claim 5, wherein a third time from switching the first control to the second control to convey the recording material to the double-side conveyance path until starting the reciprocating control is longer than a half of the time difference.

7. The image forming apparatus according to claim 6, wherein the control unit corrects the first time, the second time, and the third time by a predetermined offset value or a correction coefficient.

8. The image forming apparatus according to claim 1, further comprising a third detecting unit provided in the double-side conveyance path and capable of detecting a leading end and a trailing end of the recording material being conveyed by the second control, wherein the control unit predicts whether or not the recording material reaches the transfer portion earlier than the toner image based on a detecting result of the third detecting unit.

9. The image forming apparatus according to claim 8, wherein the control unit repeatedly performs the reciprocating control from when the image forming portion starts an image formation of the toner image to be formed on the second side until a predetermined time is elapsed.

10. The image forming apparatus according to claim 1, further comprising a length detecting unit configured to detect a length of the recording material being conveyed in the conveyance direction, wherein the control unit acquires a number of performing the reciprocating control, a first time when the first control is performed in the reciprocating control, and a second time when the second control is performed in the reciprocating control based on a length difference between (1) the length of the recording material in the conveyance direction reserved in the print start and (2) the length in the conveyance direction detected by the length detecting unit.

* * * * *